United States Patent [19]

Huinink et al.

[11] Patent Number: 4,610,288

[45] Date of Patent: Sep. 9, 1986

[54] APPARATUS FOR MOUNTING PNEUMATIC VEHICLE TIRES

[75] Inventors: Heinrich Huinink, Garbsen; Hans Seitz, Langenhagen; Heinz-Dieter Rach, Garbsen; Udo Frerichs, Langenhagen, all of Fed. Rep. of Germany

[73] Assignee: Continental Gummi-Werke Aktiengesellschaft, Hannover, Fed. Rep. of Germany

[21] Appl. No.: 653,493

[22] Filed: Sep. 21, 1984

[30] Foreign Application Priority Data

Sep. 22, 1983 [DE] Fed. Rep. of Germany ... 334203221

[51] Int. Cl.[4] ............................................. B60C 25/08
[52] U.S. Cl. ................................................. 157/1.22
[58] Field of Search ................ 157/1, 1.17, 1.22, 1.24

[56] References Cited

U.S. PATENT DOCUMENTS

| 1,766,727 | 6/1930 | Steele | 157/1.22 X |
| 3,029,861 | 4/1922 | Gambardella | 157/1.22 |
| 3,858,637 | 1/1975 | Duquesne | 157/1.24 |
| 4,262,727 | 4/1981 | Schifferly | 157/1.24 |
| 4,516,617 | 5/1985 | Seitz et al. | 157/1 |

Primary Examiner—James G. Smith
Attorney, Agent, or Firm—Becker & Becker

[57] ABSTRACT

An apparatus for mounting pneumatic vehicle tires, the beads of which, in the mounted state, are disposed on the radially inner periphery of a wheel rim. The apparatus permits simple and rapid mounting of a tire. A mounting unit which, after the introduction of a portion of the tire bead in a recessed portion of the rim, fixes the bead portion. A drivable roller, which in operation engages in the bead region of the tire, has a circumferential speed which is greater than the rolling speed on the tire.

9 Claims, 3 Drawing Figures

2

APPARATUS FOR MOUNTING PNEUMATIC VEHICLE TIRES

BACKGROUND OF THE INVENTION

1. Field of the Invention

The present invention relates to an apparatus for mounting pneumatic vehicle tires, the beads of which, in the mounted state, are disposed along the radially inner periphery of the rim.

2. DESCRIPTION OF THE ART

With vehicle wheels such as those described in German Offenlegungsschrift 30 00 428, tires cannot be mounted with customary mounting apparatus because, in contrast to the conventionally utilized wheels, to mount such tires their beads must first be placed in recessed portions located radially inwardly on the rim in order on the opposite side to be able to be pushed over the radially inwardly extending rim flange.

An object of the present invention is to provide a mounting apparatus for tires of the aforementioned type.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

The mounting apparatus of the present invention is characterized primarily by mounting means which, after the introduction of a tire bead portion into a recessed portion (deep bed) of the rim, fixes the bead portion, and by a drivable roller which during operation engages in the bead region of the tire, and the circumferential speed of which is greater than the rolling speed on the tire.

With the present invention, it is possible, in a simple manner which protects the tires, to mount tires on very different types of rims, which frequently differ from one type of automobile to another. By means of the inventive roller, which in contrast to heretofore known apparatus is drivable, and which represents the principal part of the present invention, it is above all possible to achieve a very rapid mounting of the tire with few manipulations.

Pursuant to a preferred embodiment of the present invention, the mounting apparatus has a lever mechanism as the mounting means for fixing the bead portion. A driven mounting roller engages the bead region at an angle in such a way that it presses that portion of the bead disposed in the vicinity of the lever mechanism into the recesed mounting portion (deep bed), and in particular with a force component which is directed toward that bead portion which is first fixed. By at the same time turning the turntable along with the rim, the tire bead is pressed over the entire periphery of the rim into the recessed mounting portion (deep bed), and it then springs on its own, or at the latest during inflation with air, onto the rim seating surface. With such a lever mechanism, a mounting spoon, which engages in the radially inner region of the tire bead, exerts a movement which is directed predominantly axially inwardly and slightly radially outwardly.

With the mounting apparatus of the present invention, tires can also be mounted on such wheels where the tire beads are eccentrically designed and the rims have no separate recessed mounting portions. In such a case, the seating surfaces proper for the beads, in conjunction with the reduced effective diameter of the tire in the bead region, serve in the mounting position as the deep bed.

Pursuant to further specific features of the present invention, the axis of rotation of the roller is inclined to the vertical axis and to the axis of rotation of the tire. The drivable roller can have a concave cross section, or it can be conical or tapered. The surface of the roller can also have the shape of a screw thread.

The roller can be provided with a coating which, in conjunction with the tire material on the bead surface, has a high coefficient of friction.

A second drivable roller can be used as the mounting means, and both rollers, during mounting of a tire, can be guided in opposite directions about the circumference of the rim.

The roller and the turntable can be driven by a single drive source.

DESCRIPTION OF PREFERRED EMBODIMENTS

Figure 1:
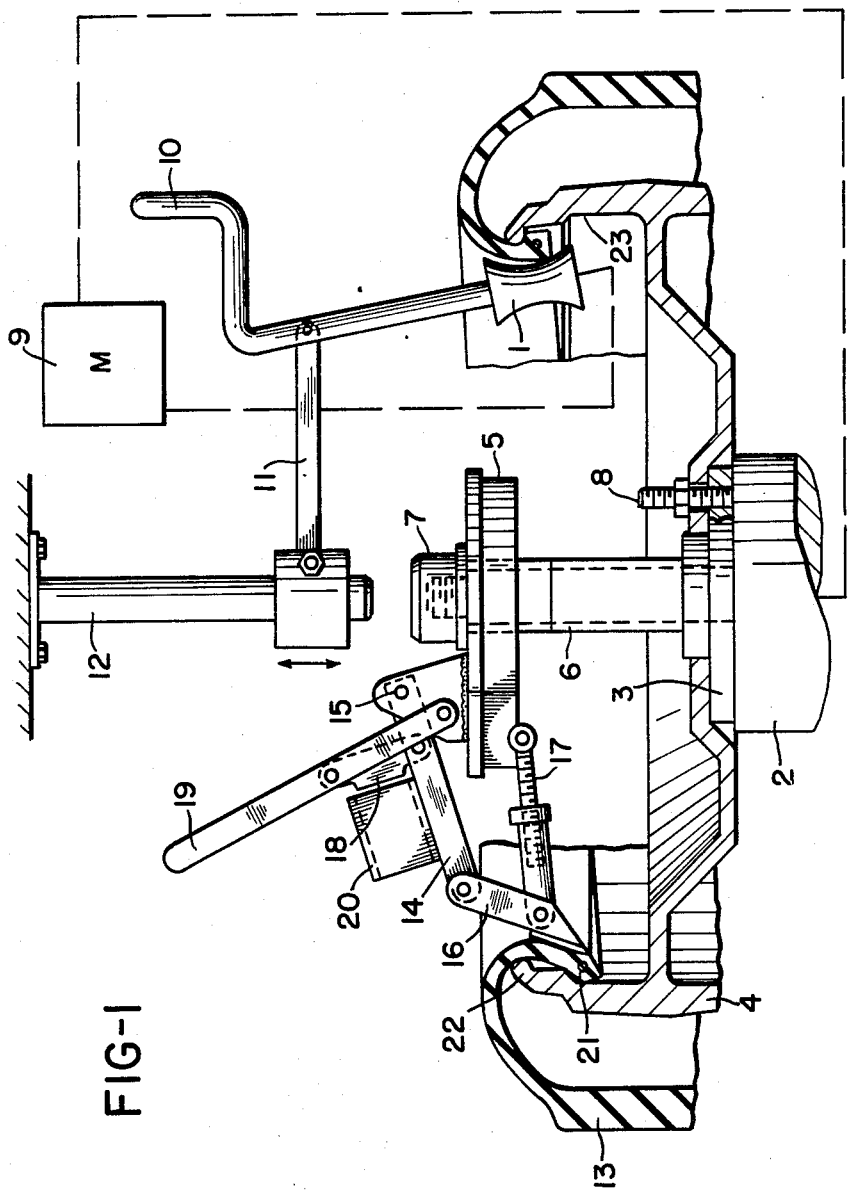
FIG. 1 is a partially sectioned front view of one inventive embodiment of the mounting apparatus having a concave roller, and on which a rim and tire are placed.

Referring now to the drawings in detail, the apparatus illustrated in FIG. 1 essentially comprises a motor-driven roller 1, a mounting stand or support having a turntable 2, a receiving flange 3 for a wheel rim 4, and a support plate 5 which is equipped with a lever mechanism. The support plate 5 can be placed on a column of the turntable 2, is held by means of a spacer 6 at a selected distance from the receiving flange 3 and hence the rim 4, and can be fixed on the column by means of a fastening element 7.

The receiving flange 3 is adapted to the contours of the rim 4 which is to be used, and is provided with fixing pins 8 at those locations at which holes are located in the rim 4 for mounting a wheel; the rim 4 can be placed on the fixing pins 8, with the aid of which the rim 4 can be bolted to the receiving flange 3.

The principal part of the mounting apparatus is the motor-driven roller 1, which in the embodiment of FIG. 1 is embodied as a concave roller having slightly inwardly curved surfaces. The drive for the roller 1 can be effected by a motor 9 via either a shaft or drive belts. The roller 1 and the turntable 2 can each have a separate drive motor 9; however, they can also be driven by the same motor 9 using a gear unit. A guide handle 10, which is pivotably mounted on a lever arm 11, is used to guide the roller 1. The other end of the lever arm 11 can be rotated or fixed, and is mounted in such a way on a column part 12 that the height thereof can be adjusted. The axis of rotation of the roller 1 extends at an angle to the axis of rotation of the tire 13 and to a vertical axis which extends at right angles thereto.

The lever mechanism of the mounting apparatus is mounted on the disk-shaped support plate 5.

The lever mechanism includes a mounting arm 14, one end of which is rotatably mounted in a bearing 15 located on the support plate 5, and the other end of which is rotatably connected with one end of a mounting spoon 16. The other end of the mounting spoon 16 is guided by a lever arm 17, the length of which can be adjusted; the lever arm 17 is rotatably mounted on the support plate 5.

The lever mechanism is furthermore provided with an arresting element 18, which engages the mounting arm 14 and is controlled by a handle 19. Finally, a receiving housing 20 for a lever rod is also disposed on the mounting arm 14.

The turntable 2 has an enlarged diameter toward the bottom so that it can simultaneously serve as a support table for the tire.

The function of the inventive mounting apparatus will be described subsequently. To start with, a wheel rim 4, the rim ring of which is located in the interior of the tire 13, is mounted on the receiving flange 3, a spacer 6 is placed thereupon, and the lever mechanism is mounted. The mounting spoon 16 of the lever mechanism is disposed in its highest position.

The introduction of the rim 4 into the interior of the tire can take place manually in a very simple manner by moving a rim toward the tire 13 at right angles thereto, pressing the beads 21 of the tire slightly apart (O-shaped cross section of the bead cores), and turning the rim by 90° in the interior of the tire.

Initially, a lever rod is placed in the receiving housing 20 and is pressed down. The mounting spoon 16, the engagement or working surface of which rests against the tire bead 21 in the radially inner region thereof, is thereby pressed downwardly and takes along a portion of the tire bead 21, i.e. it presses this bead portion over and away from the rim flange 22. Since the mounting spoon 16 is furthermore guided by the lever arm 17, which carries out a rotary movement about its shaft on the support plate 5, for the engagement surface of the mounting spoon 16 there exists a second movement component which results in a radially outward pressure against the tire bead 21.

At the end of the vertical movement of the lever rod, the mounting spoon 16 is in a position in which it presses the tire bead 21 into a recessed portion 23 (deep bed) of the rim 4 (FIG. 1). In this position, by shifting the handle 19, the mounting spoon 16 is fixed, so that during subsequent operations the tire bead 21 cannot spring out of the recess portion 23.

In the next step, the roller 1 is brought with the aid of the guide handle 10 into an operating position where it is disposed on a portion of the tire bead which is in the direct vicinity of the portion fixed by the mounting spoon 16. The axis of the roller 1 is inclined at such an angle to the axis of rotation and to a vertical axis of the tire 13 that after the roller motor 9 has been started, the roller 1 exerts upon the tire bead 21 a force which on the one hand has an axial inwardly directed component, and on the other hand has a component which is directed in the circumferential direction upon the fixed portion of the bead. In addition to the inclined disposition of the roller 1, this is achieved by the fact that the circumferential speed of the roller 1 is greater than the rolling speed on the tire 13. Due to the simultaneous rotation of the turntable 2 with the rim 4 and the tire 13, the tire bead 21 is pressed into the recessed mounting portion 23 over the entire circumference of the bead. To increase the effectiveness, the roller 1 can be provided with a friction-increasing coating. After the roller 1 and the mounting spoon 16 have been moved out of the operating position, and the rim 4 and the tire 13 have been turned over, the second tire bead 21 can be mounted in the same manner. It should be noted, however, that in the case of an unsymmetrical rim well, a different spacer 6 will have to be used.

Figure 2:
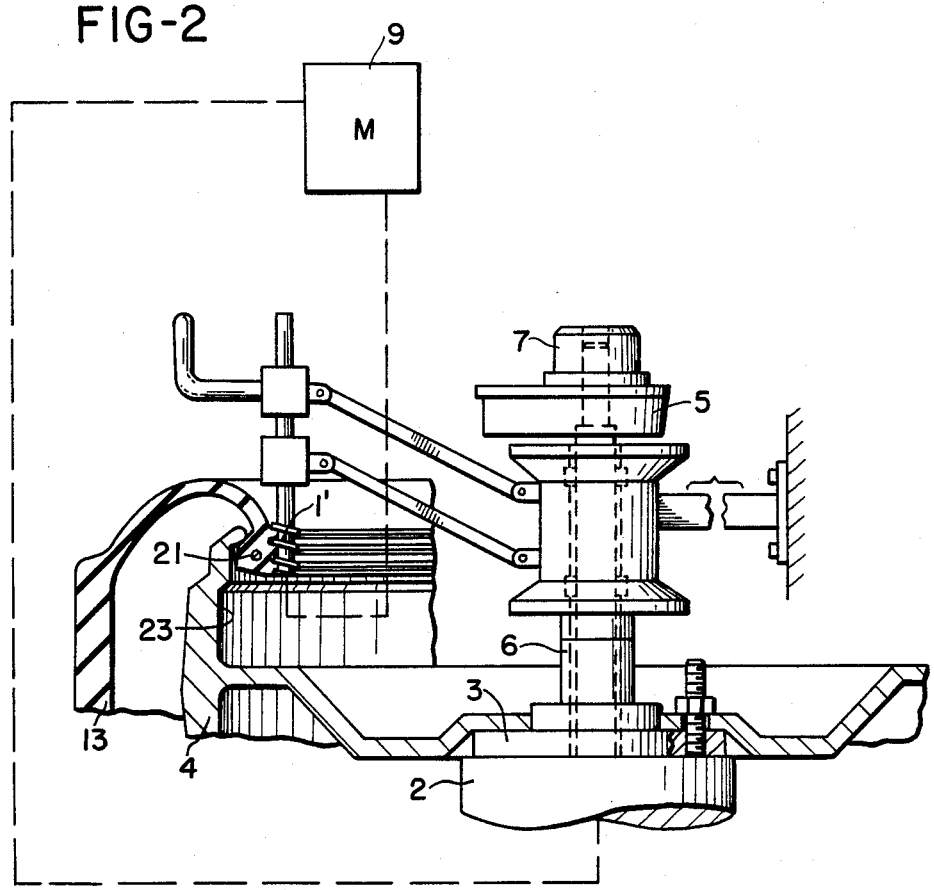
FIG. 2 is a partially sectioned front view of another inventive embodiment of a mounting apparatus, according to which the surface of the roller has the shape of a screw thread.

The mounting apparatus of the embodiment shown in FIG. 2 differs primarily from the above described embodiment in terms of the mounting roller 1', the surface of which is in the shape of a screw thread. Such a roller 1' is of particularly favorable application when the bead region of the tire 13 has appropriate grooves and lands, because then the rotation of the roller 1' reliably presses the tire bead 21 into the recessed mounting portion 23. Such an embodiment of the roller 1' and the tire bead 21 is also advantageous with so-called eccentric chafers, i.e. with tires where the bead core is eccentrically mounted in a tilting bead. For mounting, the bead is disposed in a position in which it is pressed into a seating surface and can then be pushed over the rim flange on the opposite side; the bead subsequently turns into the operating position. The seating surfaces on the rim thus simultaneously serve as recessed mounting portions, so that separate recess portions 23 become unnecessary.

The roller 1' in FIG. 2 is subjected to a parallelogram movement, so that as it is lowered, it simultaneously moves slightly radially outwardly, hence pressing the bead 21 into the recessed mounting portion 23. In other respects, the mounting apparatus is again designed in such a way that the roller 1' remains at the location of the operator during mounting, while the turntable 2 with the rim 4 and the tire 13, as well as the lever mechanism disposed on the support plate 5, nearly execute a rotation.

Figure 3:
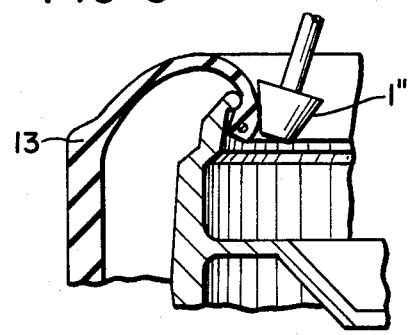
FIG. 3 is a partially sectioned front view of a portion of yet another inventive embodiment of a mounting apparatus having a tapered roller.

FIG. 3 illustrates a portion of a mounting apparatus having a conical or tapered mounting roller 1''. All other parts of the apparatus can be embodied in the same manner as those of the first two embodiments.

It should be noted that if necessary, the lever mechanism can, of course, be mounted radially outwardly of the tire, for example on the turntable, instead of being mounted on a central column, so that only the mounting spoon extends into the interior. The lever mechanism can also be embodied in such a way that it is hydraulically or pneumatically controlled. Furthermore, it is also possible to provide a second roller in place of the lever mechanism. In such a case, a fixed mounting table would be used in place of the turntable, the rollers would be placed in the immediate vicinity on the tire bead, and the rollers would be guided around in opposite directions along the periphery of the tire in the bead region. The two rollers would turn in such a way that the one component of the force which acts upon the tire bead would be directed tangentially in the direction of the already mounted peripheral portion of the tire bead. Finally, it should also be noted that two separate motors or a single motor having a gear unit can be used for driving the turntable and the roller. If the turntable, with the rim and the tire, is slowed down in a selected manner, it is even possible to exclusively drive the mounting roller.

The present invention is, of course, in no way restricted to the specific disclosure of the specification and drawings, but also encompasses any modifications within the scope of the appended claims.

What we claim is:

1. An apparatus for mounting a pneumatic vehicle tire, the beads of which, in the mounted state, are disposed on the radially inner periphery of a wheel rim having a recessed portion; the apparatus comprising:
   mounting means which, after the introduction of a portion of one of said beads of said tire into said recessed portion, fixes said bead portion; and
   a motor driven roller, which at the start of operation engages with radial as well as tangential forces in the vicinity of said fixed bead portion of said tire and is then movable over the remainder of said bead portion; the circumferential speed of said motor driven roller being greater than the rolling speed on said tire.

2. An apparatus according to claim 1, in which said roller is tapered.

3. An apparatus according to claim 1, in which said roller has a coating which, in conjunction with the tire material on the surface of said beads, has a high coefficient of friction.

4. An apparatus according to claim 1, in which said mounting means comprises a second drivable roller, with both of said rollers, during mounting of a tire, being guided about the periphery of said rim in opposite directions.

5. An apparatus for mounting a pneumatic vehicle tire, the beads of which, in the mounted state, are disposed on the radially inner periphery of a wheel rim having a recessed portion; the apparatus comprises:
   mounting means which, after the introduction of a portion of one of said beads of said tire into said recessed portion, fixes said bead portion;
   a drivable roller, which at the start of operation engages in the vicinity of said fixed bead portion of said tire and is then adapted to be moved over the remainder of said bead portion; the circumferential speed of said roller is greater than the rolling speed on said tire; a turntable to which said mounting means is operatively connected; and
   a single drive means for driving both said roller and said turntable.

6. An apparatus according to claim 5, in which said roller is disposed in such a way that it has an axis of rotation which extends at an angle to the vertical and to the axis of rotation of said tire.

7. An apparatus according to claim 5, in which said roller has a concave cross section.

8. An apparatus according to claim 5, in which the surface of said roller is in the form of a screw thread.

9. An apparatus according to claim 5, in which said mounting means comprises a lever mechanism which includes a mounting spoon which engages a radially inner region of one of said tire beads and fixes same by exerting thereon a movement which is directed predominantly axially inwardly and slightly radially outwardly.

* * * * *

UNITED STATES PATENT AND TRADEMARK OFFICE
CERTIFICATE OF CORRECTION

PATENT NO. : 4610288
DATED     : 9 September 1986
INVENTOR(S) : HEINRICH HUININK ET AL It is certified that error appears in the above-identified patent and that said Letters Patent is hereby corrected as shown below:

On the Title/Abstract Page, please correct the following:

[30]  Foreign Application Priority Data
   Sep 22, 1983 [DE] Fed. Rep. of Germany...3334203

Signed and Sealed this

Fifteenth Day of September, 1987

*Attest:*

DONALD J. QUIGG

*Attesting Officer*  *Commissioner of Patents and Trademarks*